Figure 1:
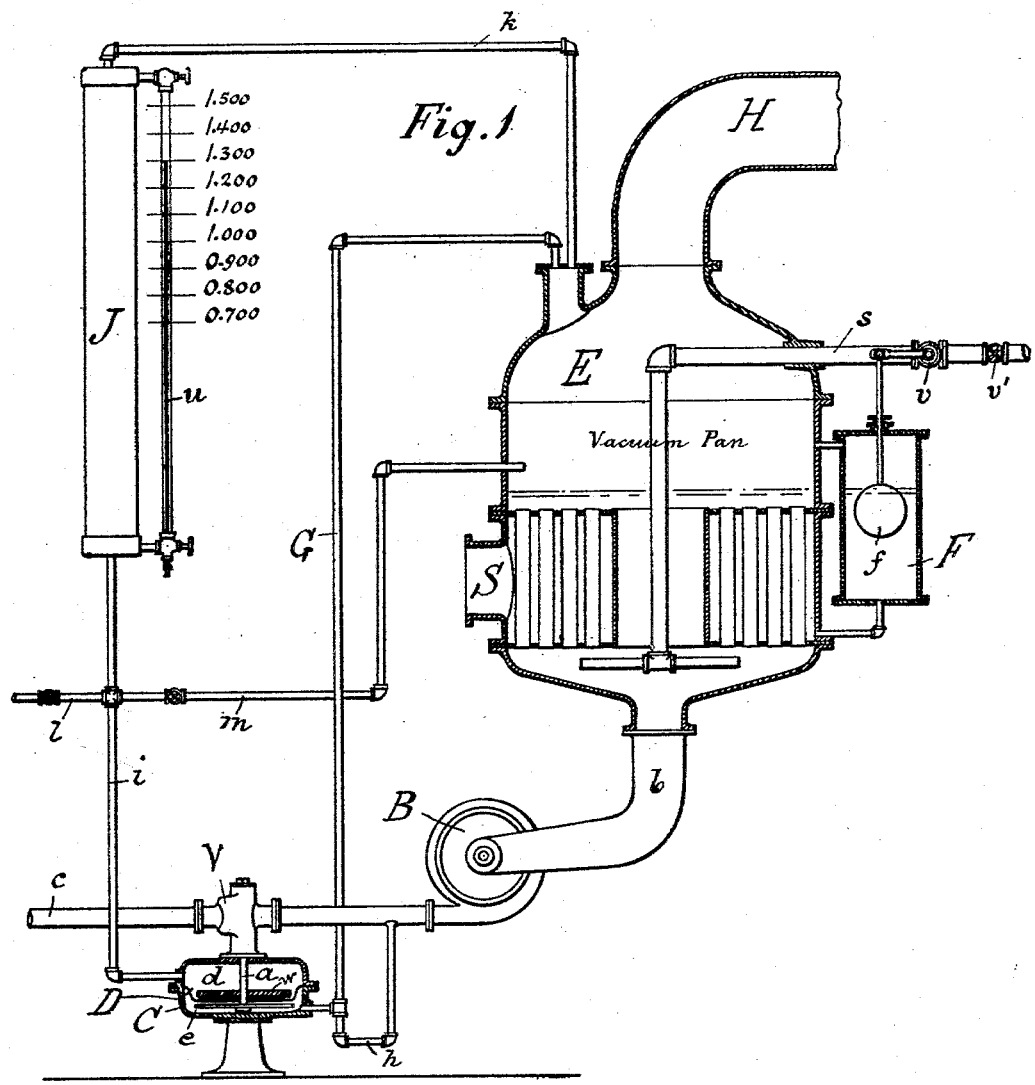

(No Model.) 2 Sheets—Sheet 2.
S. M. LILLIE.
AUTOMATIC DENSITY REGULATOR.
No. 559,857. Patented May 12, 1896.
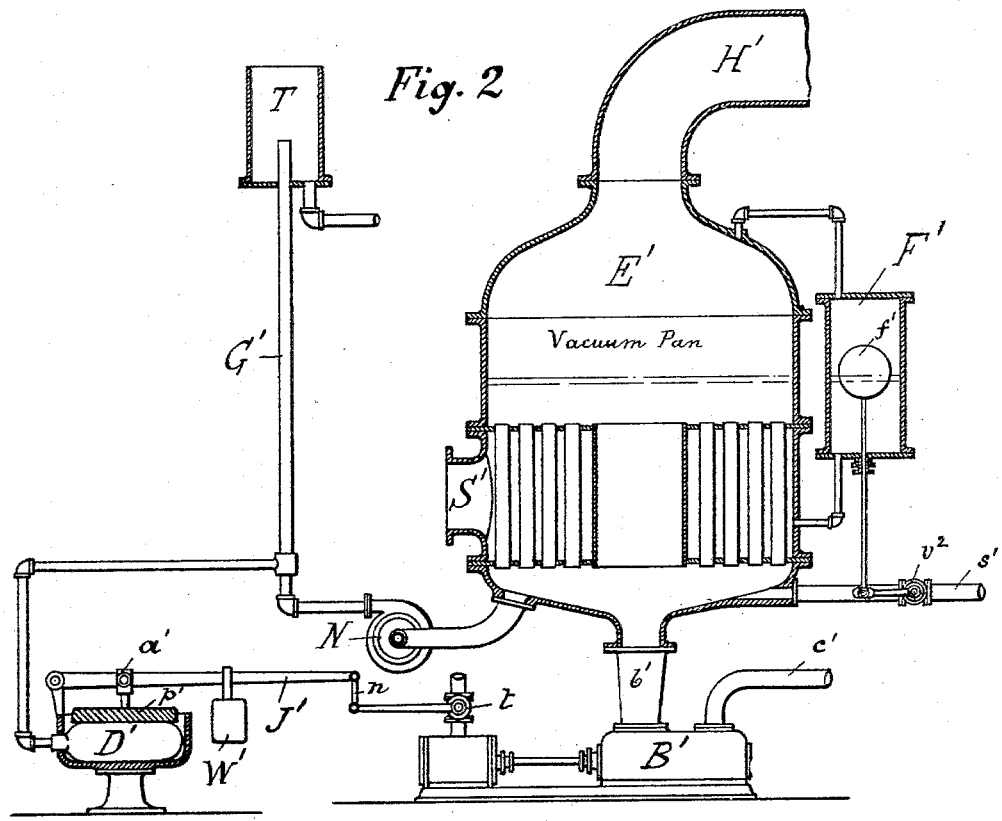
Fig. 2
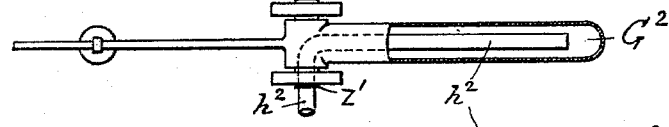
Fig. 3 Plan
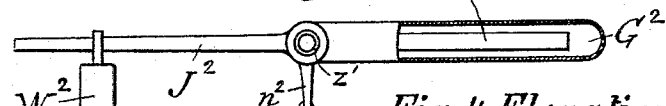
Fig. 4 Elevation
WITNESSES:
Lewis C. Lillie
Emil Ungarth
INVENTOR
S. Morris Lillie

UNITED STATES PATENT OFFICE.

SAMUEL MORRIS LILLIE, OF PHILADELPHIA, PENNSYLVANIA.

AUTOMATIC DENSITY-REGULATOR.

SPECIFICATION forming part of Letters Patent No. 559,857, dated May 12, 1896.

Application filed June 1, 1894. Serial No. 513,132. (No model.)

*To all whom it may concern:*

Be it known that I, SAMUEL MORRIS LILLIE, of Philadelphia, in the county of Philadelphia and State of Pennsylvania, have invented an Apparatus for Automatically Regulating the Density of the Thickened Liquid Resulting from the Concentration of Dilute Solutions in Evaporating Apparatus, of which the following is a specification.

My invention relates more particularly to evaporating apparatus through which the solution in process of concentration has a practically-continuous flow through the evaporating apparatus, though not at a constant rate, the rate varying with the rapidity with which the apparatus is working and with the amount of concentration desired for the solution in process.

The mode of operation of my invention consists in regulating the rate of flow of the solution through the evaporating apparatus, and consequently the density of the concentrated solution, by means of the weight of a column of the solution maintained at a density which varies with the density at which the solution is leaving the apparatus, acting through suitable means to increase the flow of solution through the apparatus and against an adjustable or regulable force tending to diminish or stop the said flow. The apparatus which I prefer and have in use for practicing this method consists of a valve in the solution-supply or solution-discharge pipe of the apparatus, connected with and operated by a movable or expansible diaphragm or piston, which in turn has a pressure exerted upon it tending to move it to open the said valve by a column of the solution which is maintained by suitable means at practically the same density as that of the concentrated solution leaving the apparatus; and it consists, further, of a counterpoise, adjustable as to its weight or leverage, which tends to close the valve against the pressure of the said column of solution; and, as a rule, it consists still further of means, in combination with the above, for maintaining the quantity of the solution in the apparatus practically uniform.

In the accompanying drawings is shown apparatus adapted to practice my invention, of which—

Figure 1 is a view of the apparatus I prefer, and Figs. 2, 3, and 4 show modified apparatus adapted to practice my invention.

Referring to Fig. 1, E represents an ordinary type of evaporating-pan for concentrating solutions by evaporation *in vacuo*, known as the "Roberts" pan, in which the tubes are surrounded by steam supplied through a main S, while the solution in process of concentration fills the tubes, the space below the lower tube-plate, and part of the vapor-dome above the upper tube-plate—say as high as the dotted line. The dilute solution flows into the pan through the pipe $s$, as regulated by a hand-valve $v'$, or by a valve $v$, automatically controlled to keep the solution at a certain height in the pan by the float $f$ in the chamber F, which chamber is connected from above and from below with the interior of the pan, so that the liquid always stands at the same level in the chamber and in the pan. The float $f$ is connected with the valve $v$ by intermediate mechanism, which acts to close the valve as the float rises with the level of the liquid and to open it as the float falls. This combination of devices, it is evident, operates to let fresh solution into the pan as rapidly as it is evaporated or is drawn away from the pan, and so to keep the liquid in the pan at a nearly constant height and quantity.

B is a pump, commonly called the "tail-pump," (represented in the drawings as a centrifugal pump,) which draws the concentrated solution away continuously, or practically so, from the bottom of the evaporating-pan through the pipe $b$ and delivers it away through the pipe $c$ at a rate controlled by the valve V in the pipe $c$. The valve V shown is a balanced puppet or piston valve, such as are commonly sold in the market, and is supported upon the roof of the air-tight chamber C. The stem $a$ of the valve V extends downward through the roof of the chamber, and is attached to the flexible diaphragm D, which horizontally divides the chamber C into an upper compartment $d$ and a lower compartment $e$. Movement of the stem $a$ upward opens the valve V, while movement of the same downward closes the valve.

G is a small pipe, (the solution-column pipe,)—say one inch in diameter—which leads from the chamber $d$ below the diaphragm upward for a certain distance and leads into the upper part of the pan. Into the bottom of this solution-column pipe a small pipe $h$, preferably considerably smaller than the solution-column pipe G, leads from the discharge of the tail-pump B, which pipe when the tail-pump B is running permits a part of the solution delivered by the pump B to flow up through the column-pipe G back into the top of the pan and so maintain in the pipe G a column of the solution always at the density at which the concentrated solution is delivered from the pan by the pump B, which column exerts proportionate to its density an upward pressure upon the diaphragm D, tending to open the valve V in the discharge-pipe $c$ of the tail-pump B. From the chamber $d$ above the diaphragm D a small pipe $i$ extends upward, and terminates in an enlarged section J, which, with the pipe $i$, I term the "water" or "counterpoise" column pipe, which continues upward to a height depending upon what is to be the maximum density at which it will ever be desired to have the solution flow away from the evaporating-pan. The top of the pipe J is connected by the small pipe $k$ with the top of the pan E, by which means the same pressure is maintained in the top of the water or counterpoise column as exists above the solution-column in the pipe G, which also opens into the top of the pan. A supply-pipe $l$ with valve for water opens into the water-column pipe at some convenient point, and a draining-pipe $m$ leads from the same conveniently into the pan E. By means of the valves in the water connection $l$ and in the drain-pipe $m$ the column-pipe J may be filled to any height with water and the level of the latter changed to any height desired. The water-column in J, varying with its height, exerts a downward pressure against the diaphragm D and tends to close the valve V in the discharge-pipe $c$ of the pan against the pressure upward of the column of solution in G, which tends to open the said valve. The water-column pipe J is provided with a gage-glass $u$, which indicates the level of the water in the column-pipe J, and which is graduated with a scale indicating specific gravities, the graduations indicating the heights of the water-column which will respectively just balance the column of solution in the pipe G when it has the densities indicated by the graduations of the scale. Thus if the level of the water in the column-pipe J stands at "1.2" on the scale it will just balance the column of solution in G when it has a density of 1.2, and any increase in the density in G would cause the valve to open, which would be closed again by the water-column at once if the density of the solution-column in G should fall below 1.2.

The operation of the above apparatus is as follows: Assuming that it is desired to have the solution in process concentrated to and flow away from the pan at a density of about 1.3, water is run into the column-pipe J from the pipe $l$ until the water rises in J to the level marked "1.3." The pan E is charged with the dilute solution to be concentrated by opening the hand-valve $v'$ in the supply-pipe $s$ and allowing the solution to flow into the pan as regulated by the float $f$ and the valve $v$. Steam is turned into the space around the tubes through the main S, which causes the solution to boil and the contained water to evaporate and pass out through the vapor-main H of the pan to the condenser (not shown) and the solution to gradually increase in density. The centrifugal tail-pump B maintains a flow of concentrated solution via the pipe $h$ up through the column-pipe G, and also maintains a sufficient pressure of solution in the discharge-pipe $c$ to flow away through the same against atmospheric pressure when the valve V opens. The solution in the column-pipe G being kept at the same density as that in the pan E, it exerts as the concentration in the pan progresses an increasing pressure upon the diaphragm D, tending to open the valve V. When the density reaches 1.3, for which the water-column has been set, the pressure exerted by the solution-column upon the diaphragm just equals that exerted by the water-column, and when the density of the solution becomes a trifle greater the diaphragm is raised by the weight of the solution-column to open the valve V, and the concentrated solution flows away through the pipe $c$. Should the density fall at all below 1.3, for which the water-column has been set, the water-column would overbalance the solution-column and the valve V would be closed and stop the discharge of the solution from the pan. Thus if the pipe $c$ and valve V are large enough to take away, when the valve is wide open, the solution more rapidly than the pan is able to concentrate it it is apparent that the density of the solution leaving the pan will vary from a little above 1.3 to a little below 1.3 and will average about 1.3 in density. As material leaves the pan by vapor through the main H and as concentrated solution through the discharge-pipe $c$, it is replaced by dilute solution entering through the feed-pipe $s$, as automatically regulated by the float $f$ and the valve $v$, which the float actuates, so that the level of the liquid, and consequently its quantity, is maintained practically constant. The feed through the pipe $s$ could be regulated by a hand-valve $v'$; but this would make the apparatus only partially automatic, while with the feed automatically controlled, as well as the discharge, the apparatus is made quite automatic as respects the flow of solution through the same and the density of the finished product. By lowering the column of water by draining water away through the pipe $m$, or by raising the column of water by running water into it through the pipe $l$, the density at which the concentrated solution will flow away from the pan may be lowered or raised, respectively.

I would further state that when the diaphragm is raised by the liquor-column to open the valve V, water is driven from the upper compartment of the regulator-chamber into the water-column, and thereby increases the height of the column-pipe of water to a degree which will vary inversely with the cross-section of the water-column pipe J, and consequently to raise the diaphragm more and more, and so open the valve V wider and wider, demanding an increasing density in the liquor-column in G—i. e., in the solution flowing away from the pan—and it therefore follows that if the water-column has not too large a cross-section the flow of concentrated solution will not be intermittent, but will be constant, though varying in quantity if the work of the pan is not constant. Thus the solution will begin to flow away slowly on reaching density 1.3, say, but not fast enough to keep down its density, which, as it continues to increase, will open the valve wider and wider, until the solution flows away fast enough to keep the density from increasing, and then the valve and flow will remain stationary until conditions vary to change the density of the solution, should the same rate of outflow continue, when the valve would take a new and corresponding position and give a corresponding rate of outflow. The density of the outflow would consequently vary slightly with the rapidity with which the pan was working, which variation would be inversely as the cross-section of the water-column.

The pressure above the water-column and above the liquor-column is maintained the same by connecting both with the interior of the pan E, so that the pressure on the two sides of the diaphragm tending, respectively, to open and to close the valve V is due solely to the solution-column and to the counterpoise-column. If the top of the liquor-column were open to the atmosphere, as is the case in the arrangement shown in Fig. 2, the water-column would also be open to the atmosphere.

The height of the water-column may be lowered by weighting the diaphragm D, as by the piece of metal $w$ resting upon it or by springs pressing against it. For example, if the weight or pressure of the springs downward is equivalent to a pressure of two pounds per square inch upon the upper surface of the diaphragm the water-column pipe $i$ could be shortened four feet, and if a sufficient weight or strength of springs were employed the graduated section J of the water-column could be brought down near the regulator. The height of the counterpoise-column could also be diminished by using in it a heavier liquid than water—mercury, for example.

In Fig. 2 are shown other constructions of apparatus adapted to practice my invention, which apparatus differs from that shown in Fig. 1, first, in having a pump N separate from the tail-pump B' for circulating the solution through the column G'; second, in having the top of the solution-column pipe G' open to the atmosphere; third, in having the diaphragm D' replaced by a rubber bag, with the interior of which the solution-column pipe communicates and which is expanded to raise the plate $p'$ and stem $a'$ by the hydrostatic pressure of the solution-column; fourth, in substituting for the water-column counterpoise a weighted lever J', which presses down upon and resists the raising of the stem $a'$ by the solution-column, the weight W' on which lever is adjustable as to its distance from the fulcrum, so that the resistance against the solution-column, and consequently the density of the solution, may be increased or diminished by moving the weight farther from or nearer to the fulcrum; fifth, in having the motion of the piston or diaphragm vary the flow of the concentrated solution away from the apparatus by varying the speed of the tail-pump B' instead of by opening and closing a valve in the discharge-pipe. Thus the lever J' is connected by the rod $n$ with a throttle-valve $t$ in the steam-supply pipe to the steam-cylinder of the pump B', which is shown as an ordinary steam piston-pump, in such manner that as the lever J' rises it opens the throttle-valve and starts or increases the speed of the tail-pump, and hence also the rate of discharge of the concentrated solution, and if the lever falls the contrary effect is produced.

In the arrangement shown in Fig. 2 the top of the liquor-column pipe is open to the atmosphere, and the counterpoise side of the diaphragm D' is also exposed to the atmosphere, and consequently the differences of pressure between the two sides of the diaphragm tending to move the same will be due entirely to the solution-column and to the counterpoise, or rather to the fluctuations in the density of the solution-column, the counterpoise having been set for some density. The overflow of liquor from the top of the solution-column pipe G' is into a trough T and may be trapped back into the pan, or when the solution is up to density the overflow may be sent into the same receptacle into which the concentrated solution flowing from the discharge-pipe $c'$ is sent.

In Figs. 3 and 4 is shown other apparatus adapted to practice my invention, in which the solution-column pipe $G^2$ is shown horizontal. The column-pipe is closed at one end and at the other end is supported by and revolves on two hollow trunnions $z'$ and $z^2$. Beyond the trunnions, on the other side from the solution-column pipe, extends a lever $J^2$, on which hangs counterpoise-weight $W^2$, which is adjustable as to its distance from the trunnions. From the under side of the trunnions an arm $n^2$ projects, which engages with the lever of valve $V^2$ in the discharge-pipe $c^2$ of the apparatus in connection with which the regulator is supposed to work, the connection being such that as the solution-column falls it will open the valve, and as it rises it will close the valve. The inflow-pipe $h^2$ for the solution enters the solution-column pipe through one of the trunnions $z'$ and extends to near the closed end of the column. The outflow for the solution-column pipe is through the other trunnion $z^2$, and it is manifest that by the flow of the concentrated solution into and out of the column-pipe the solution in the latter is maintained at the density of the concentrated solution, as in the case of each of the solution-columns hereinbefore described. The density of the solution is regulated by moving the counterpoise-weight $W^2$ nearer to or farther from the trunnions, according as it is desired to diminish or increase the density of the solution flowing away from the apparatus.

In the several figures the density-regulator is illustrated as controlling the flow of solution through the apparatus, and so the density of the concentrated solution, by regulating the flow of the concentrated solution through the discharge-pipe of the pan; but the density may also be regulated, though not so closely, by having the automatic regulator control the flow of dilute solution into the pan. Thus in Fig. 2 we may assume that the pipe $b'$ is the discharge-pipe of the pump $B'$, that $c'$ is the suction-pipe of the pump and brings the dilute solution to be concentrated to the pump, and that the pump draws dilute solution from the pipe $c'$ and delivers it through the pipe $b'$ into the pan. The pipe $s'$ would be the discharge-pipe of the pan and the float $f'$ be connected to the valve $v^2$ to open it when the liquor in the pan should rise to and above a certain level—say that of the dotted line—and to close it when it falls below the said line. Thus arranged to regulate the flow into the pan the operation would be as follows: The pan would first be charged with solution by opening by hand the throttle-valve $t$ in the steam-pipe of the pump $B'$ and keeping it open until the pan should be filled with solution, say, up to the level of the dotted line, and then steam would be turned into the pan through the main $S'$. As the evaporation of the solution proceeded the feed of the dilute solution might be continued by hand until the solution in the pan had reached or nearly reached the density desired, and then the small pump $N$, for circulating the solution through the column-pipe $G'$, be started and thereafter the regulator be allowed to control the feed. The density in the pan having reached the density for which the regulator was set the latter would permit a constant or intermittent flow of solution into the pan to maintain the density constant and the pan would gradually fill up to and above the dotted line, when the float $f'$ would open the valve $v^2$ in the discharge-pipe $s'$ and allow the concentrated solution to flow away in proportion as the thin solution was allowed to flow into the pan, and the density of the outflowing solution would thus be maintained at approximately the density for which the automatic density-regulator had been set.

The foregoing illustrates various ways of applying my invention, which consists in the employment of the weight of a column of solution maintained preferably at the density of the concentrated solution flowing away from the vacuum-pan (which in the particular construction of pan shown is that of the mass of liquor in the pan) acting through suitable mechanism to control the flow of solution through the evaporating-pan. The solution-column may be differently arranged and located—for rough work the depth of liquor in the pan itself may be used for the solution-column—and the mechanism through which the weight of the solution-column acts may be variously arranged. For example, a modification which readily suggests itself would be, in the arrangement shown in Fig. 2, to use a tail-pump $B'$, driven by an electromotor, and have the rise and fall of the lever $J'$ make or break the electric circuit connecting to the pump-motor.

My invention is applicable not only to other constructions of evaporating apparatus than that shown in the drawings—as, for example, to the evaporating apparatus covered by United States Patent No. 440,231, issued to me November 11, 1890—but it is also applicable to such apparatus as extractors or apparatuses in which solutions of substances are made and in which the density of the resulting solution depends upon the rate at which the solvent is run through the apparatus.

Thus having described my invention, I claim—

1. In an automatic regulator for regulating the density of the solution flowing away from an apparatus of the character specified, the combination with the controlling device (as a valve, for example) which controls the flow of solution through the apparatus, of a solution-column pipe with means for maintaining the solution in the same at a density which varies with the density of the solution leaving the apparatus, and intermediate mechanism connecting the said controlling device with the solution-column pipe and actuated by the weight of the said column of solution to increase or diminish the flow of solution through the apparatus as the said weight or density increases or diminishes, substantially as and for the purpose specified.

2. In an automatic regulator for regulating the density of the solution flowing away from an apparatus of the character specified, the combination of a solution-column pipe with means for maintaining the solution in the column-pipe at a density which varies with the density of the solution leaving the apparatus, a valve regulating the flow of solution through the discharge-pipe of the apparatus, intermediate mechanism connecting the valve to the solution-column pipe and operated by the weight of solution in said pipe to move the valve to increase the flow of solution away from the apparatus, and a counterpoise connected to the valve by intermediate mechanism and operated to move the valve against the weight of the solution in the solution-column pipe to diminish the flow of solution away from the apparatus, substantially as specified.

3. In an automatic regulator for regulating the density of the solution flowing from an apparatus of the character as specified, the combination of a solution-column pipe with means for maintaining the solution in the same at a density which varies with the density of the solution leaving the apparatus, a flexible or movable diaphragm or piston, contained and movable in a suitable chamber, a pipe communicating from the bottom of the solution-column to the chamber on one side of the diaphragm or piston whereby the hydrostatic pressure of the column of solution is transmitted to and over the area of the diaphragm or piston and tends to move the same in one direction, a counterpoise bearing upon the piston or diaphragm and tending to move it in a contrary direction, and mechanism connected to the diaphragm or piston and moving with it and operated to increase or decrease the flow of solution through the apparatus according as the piston is moved in one direction by the hydrostatic pressure due to the solution-column, or in the opposite direction by the counterpoise substantially as and for the purpose specified.

4. In an automatic regulator for regulating the density of the solution flowing from an apparatus of the character specified, the combination of a solution-column pipe with means for maintaining the solution in the same at a density which varies with the density of the solution leaving the apparatus, a closed chamber having a movable diaphragm or piston in it and connected on one side of the diaphragm or piston with the bottom of the solution-column pipe by suitable pipe, a water-column pipe connecting with the chamber on the other side of the diaphragm or piston, the top of the water-column pipe and the top of the solution-column communicating with a common space to maintain the same pressure on the top of each, connections for running water into and out of the water-column pipe, and mechanism connected with and moved by the piston or diaphragm and operating to increase the flow of solution through the apparatus as the piston or diaphragm is moved in one direction by the pressure due to the solution-column, and to diminish the same as the piston or diaphragm is moved in the opposite direction by the pressure due to the water-column, substantially as and for the purpose specified.

S. MORRIS LILLIE.

Witnesses:
LEWIS C. LILLIE,
G. MILLUNGARTH.